United States Patent
Moriyama et al.

(10) Patent No.: US 6,213,650 B1
(45) Date of Patent: Apr. 10, 2001

(54) METHOD OF MAKING OPTICAL MODULE

(75) Inventors: Yutaka Moriyama; Sosaku Sawada; Seiji Kumagai, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/251,930

(22) Filed: Feb. 18, 1999

(30) Foreign Application Priority Data

Feb. 20, 1998 (JP) .................................................. 10-038740

(51) Int. Cl.[7] ........................................................ G02B 3/36
(52) U.S. Cl. ................................. 385/88; 385/91; 385/94
(58) Field of Search ................................. 385/49, 88, 90, 385/91, 92, 94; 257/98, 99

(56) References Cited

U.S. PATENT DOCUMENTS

| | | | |
|---|---|---|---|
| 3,897,288 | * 7/1975 | Fayling | 156/60 |
| 5,515,468 | 5/1996 | DeAndrea et al. | 385/98 |
| 6,004,046 | * 12/1999 | Sawada | 385/92 |

FOREIGN PATENT DOCUMENTS 63-90866    4/1988   (JP) .

* cited by examiner

Primary Examiner—Cassandra Spyrou
Assistant Examiner—Jared Treas
(74) Attorney, Agent, or Firm—Smith, Gambrell & Russell

(57) ABSTRACT

A bonding method for effectively preventing once-adjusted members from positionally deviating is disclosed. In this method, when applied to a method of making an optical module in particular, a holding member such as a magnet which generates a magnetic force against a housing is attached to, and a relative position of an optical reflecting member once adjusted by the holding member is held. As a result of this configuration, the optical reflecting member is effectively prevented from positionally deviating.

5 Claims, 10 Drawing Sheets

Fig.10
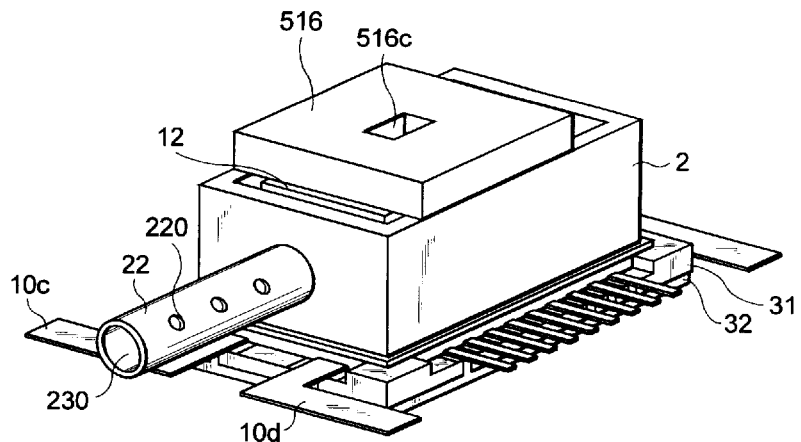
Fig.11B
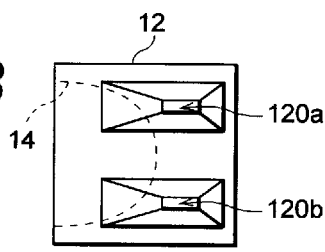
Fig.11A 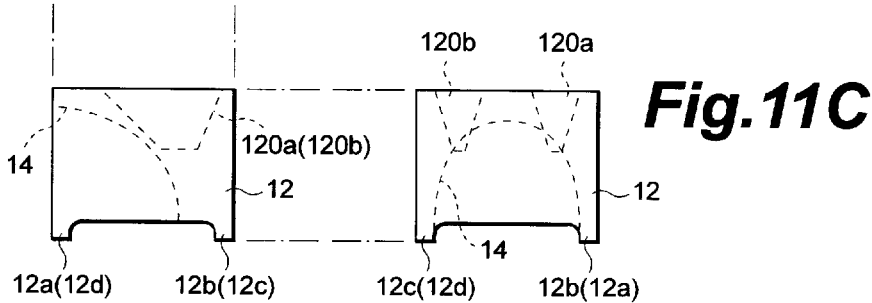 Fig.11C

METHOD OF MAKING OPTICAL MODULE

BACKGROUND OF THE INVENTION

1. Field of the Invention

The present invention relates to a bonding method of optical members which are positioned with high accuracy; and, in particular, to a bonding method applicable to producing an optical module employed in optical communications. The optical module contains a semiconductor device such as a light-receiving device or a light-emitting device and provides a configuration for optically coupling an optical fiber and the semiconductor device to each other with high accuracy.

2. Related Background Art

A conventional optical module in which an optical fiber acting as a transmission medium for signal light and a semiconductor device such as a light-receiving device or light-emitting device are optically coupled to each other. Such modules employ a structure for maintaining the optically coupled state between the optical fiber and the semiconductor device by integrally encapsulating a condenser lens and a plane reflecting surface, which are disposed in the optical path between an end face of the optical fiber and the semiconductor device. The conventional optical module, for example, Japanese Patent Application Laid-Open No. 63-090866 discloses an optical receiver module configured such that light emitted from an end face of an optical fiber and passed through a condenser lens is reflected by a plane reflecting surface to be incident on the light-receiving surface of a light-receiving device.

SUMMARY OF THE INVENTION

Having studied conventional methods of making an optical module, the inventors have found the following problems. In the conventional methods, a condenser lens and a plane reflecting mirror are integrally encapsulated with a transparent resin together with a semiconductor device. It is necessary to establish optical axis alignment between the condenser lens, the plane reflecting mirror and semiconductor device, and encapsulate them with a resin after the position of the semiconductor device is set with a sufficiently high accuracy. However, it has been quite difficult to improve the positioning accuracy of such a semiconductor device, and prevent the position from shifting during the encapsulation. The conventional methods have been unsuitable for making an optical module employed in the field of optical communications.

Although the conventional optical module is applicable to fields which do not require a relatively high accuracy, e.g., a field which allows a relatively broad luminous flux incident on a light-receiving device having a large light-receiving area, it can not be used for a field in which a very high aligning accuracy is required such as optical communications. This is because the core diameter of the optical fiber is only about a few $\mu$m and the light-receiving area of the light-receiving device is only about several hundred square $\mu$m. When an optical module for optical communications is manufactured by employing a conventional technique, there is a possibility that detrimental effects such as the lowering of the optical coupling efficiency between the optical fiber and the semiconductor device will occur.

In recent years, as the transmission speed in optical fiber communications has been reaching a GHz band, there has been a demand for developing an optical module which can attain a higher aligning accuracy. If the position of the plane reflecting mirror or the like shifts at the resin encapsulation (at the member-fixing step) after the alignment, then even the aligning accuracy that was once attained may deteriorate.

In order to overcome such problems, it is an object of the present invention to provide a bonding method which is applicable to fields in which positions between members with high accuracy is required. For example, when applied to making an optical module having a configuration in which alignment can be adjusted much more easily than conventional methods and making it possible to reduce the number of its components, the bonding method according to the present invention effectively prevents the optical coupling efficiency of the once-adjusted members from deteriorating.

The optical module fabricated by the method according to the present invention comprises: a housing having a mounting surface for mounting a semiconductor device; a sleeve, extending along a predetermined direction from a side wall of the housing, for supporting a ferrule attached to a front end of an optical fiber; and an optical reflecting member having a curved reflecting surface, which is put in the housing, for optically coupling the optical fiber and the semiconductor device to each other. In this method, in particular, the optical reflecting member having a reflecting surface with a predetermined form for optically coupling the semiconductor device and the optical fiber to each other is fixed at a predetermined position in the housing.

The semiconductor device encompasses, at least, a light-emitting device and a light-receiving device. The optical module encompasses an optical transmitter module in which a light-emitting device is mounted, while the light-emitting surface of the light-emitting device and the end face of an optical fiber are optically coupled to each other; and an optical receiver module in which a light-receiving device is mounted, while the light-receiving surface of the light-receiving device and the end face of an optical fiber are optically coupled to each other.

In particular, the reflecting surface of the optical reflecting member preferably has a concave surface form coinciding with a portion of a virtually defined rotational ellipsoid. In order to attain a high aligning accuracy, the optical reflecting member having such a specific form is installed at a predetermined position in the housing such that the end face of the optical fiber coincides with the first focal point of the rotational ellipsoid, whereas the main surface of the semiconductor device (the light-emitting surface in the light-emitting device or the light-receiving surface in the light-receiving device) coincides with the second focal point of the rotational ellipsoid.

In the optical receiver module, even if a signal luminous flux is emitted from the end face of the optical fiber with an angle, it will be reflected by a certain portion of the reflecting surface and reach the light-receiving surface of the light-receiving device as long as the light exit end face coincides with the first focal point. On the other hand, in the case of the optical transmitter module, the light emitted from the light-emitting surface of the light-emitting device with an angle also reaches the end face of the optical fiber due to the action of the reflecting surface mentioned above.

When making an optical module provided with a configuration mentioned above, the most important point is the positional deviation of the optical reflecting member. In particular, the optical reflecting member is installed at a predetermined position in the housing such that the end face of the optical fiber opposing the reflecting surface coincides with the first focal point of the rotational ellipsoid, whereas the main surface of the semiconductor device (e.g., the light-receiving surface in the light-receiving device) opposing the reflecting surface coincides with the second focal point of the rotational ellipsoid. If the optical reflecting member positionally shifts after such an aligning operation, there will be a possibility of insufficient alignment accuracy.

The method of making an optical module according to the present invention comprises the steps of installing the optical reflecting member at a given position on the mounting surface in the housing with an adhesive and preventing the optical reflecting member from positionally shifting by using a holding member such as a magnet generating a magnetic force against the housing. Specifically, the holding member is provided with a protrusion adapted to engage a depression formed in the upper face of the optical reflecting member. When the holding member is attached to the housing, the protrusion engages the depression in the optical reflecting member.

The positional adjustment (aligning operation) of the optical reflecting member is carried out, for example, by monitoring the output of a semiconductor device (e.g., photo diode PD) receiving light emitted from the optical fiber while moving the optical reflecting member along the mounting surface. The optical reflecting member is bonded and fixed at the position where the output of the semiconductor device is maximized.

In the state where the protrusion of the holding member engages the depression of the optical reflecting member, the optical reflecting member would move together with the holding member. In the method of making an optical module according to the present invention, by moving the optical reflecting member together with the holding member along the mounting surface in the housing, the position of the reflecting surface in the optical reflecting member is adjusted. Subsequently, the adhesive is cured so that the optical reflecting member is fixed at a desirable position, and then the holding member is removed.

Since the position of the optical reflecting member is thus maintained by the magnetic force between the housing and the holding member until the bonding and fixing, the optical reflecting member is prevented from positionally shifting during the manufacturing steps.

For facilitating the aligning operation, the adhesive is preferably at least one of UV-curable resins and thermosetting resins.

The bonding method using a magnet member is applicable not only to the above-mentioned method of making an optical module but also to various fields in which members positioned with respect to each other with high accuracy are needed.

For fixing one member to the other member with an adhesive, the bonding method according to the present invention comprises the steps of adjusting relative positions of the members with the adhesive interposed therebetween, and curing the adhesive where a relative positional relationship between the members is held with a magnet member. When a magnet member is used for preventing a member from positionally shifting during the curing of the adhesive, then the respective positions of the members after the adjustment can easily be maintained. The magnet member may be removed after each member is bonded together. It is not always necessary for the first member and/or second member to generate a magnetic attraction force with respect to the magnet member. As long as the respective positions of the first and second members are defined by the magnet member and another member generating a magnetic force with the magnetic member, this bonding method is also applicable, to tasks such as the bonding between plastic members.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 3A to 3C are sectional views showing an inner configuration of the optical module shown in FIG. 2, in which FIG. 3A is a sectional view taken along the I—I line in FIG. 2, FIG. 3B is a sectional view taken along the II—II line in FIG. 2, and FIG. 3C is a sectional view taken along the III—III line in FIG. 2;

FIGS. 5A and 5B are views for explaining functions of the optical module, in which FIG. 5A is a view for explaining the form of an optical fiber end face, whereas FIG. 5B is a view for explaining an aligning function between the optical fiber and a semiconductor device;

FIG. 6A is a plan view showing the configuration of a positioning device for installing at a predetermined position an optical reflecting member having a specific form applicable to the optical module, whereas

FIG. 10 is a perspective view showing the optical module after the positioning operation is completed;

FIGS. 11A to 11C are views showing the configuration of the optical reflecting member.

DETAILED DESCRIPTION OF THE PREFERRED EMBODIMENTS

In the following, the bonding method according to the present invention is applied to a method of making an optical module will be explained with reference to FIGS. 1, 2, 3A to 3C, 4, 5A to 6B, 7, 8A to 9B, 10, and 11A to 12D. Among the drawings, parts identical to each other will be referred to with numerals identical to each other, without their overlapping explanations being repeated. The optical module encompasses an optical receiver module employing a semiconductor light-receiving device and an optical transmitter module employing a semiconductor light-emitting device. Since their basic configurations are identical to each other except for the semiconductor devices employed, only the light-receiving module will be explained hereinafter in this specification.

Figure 1:
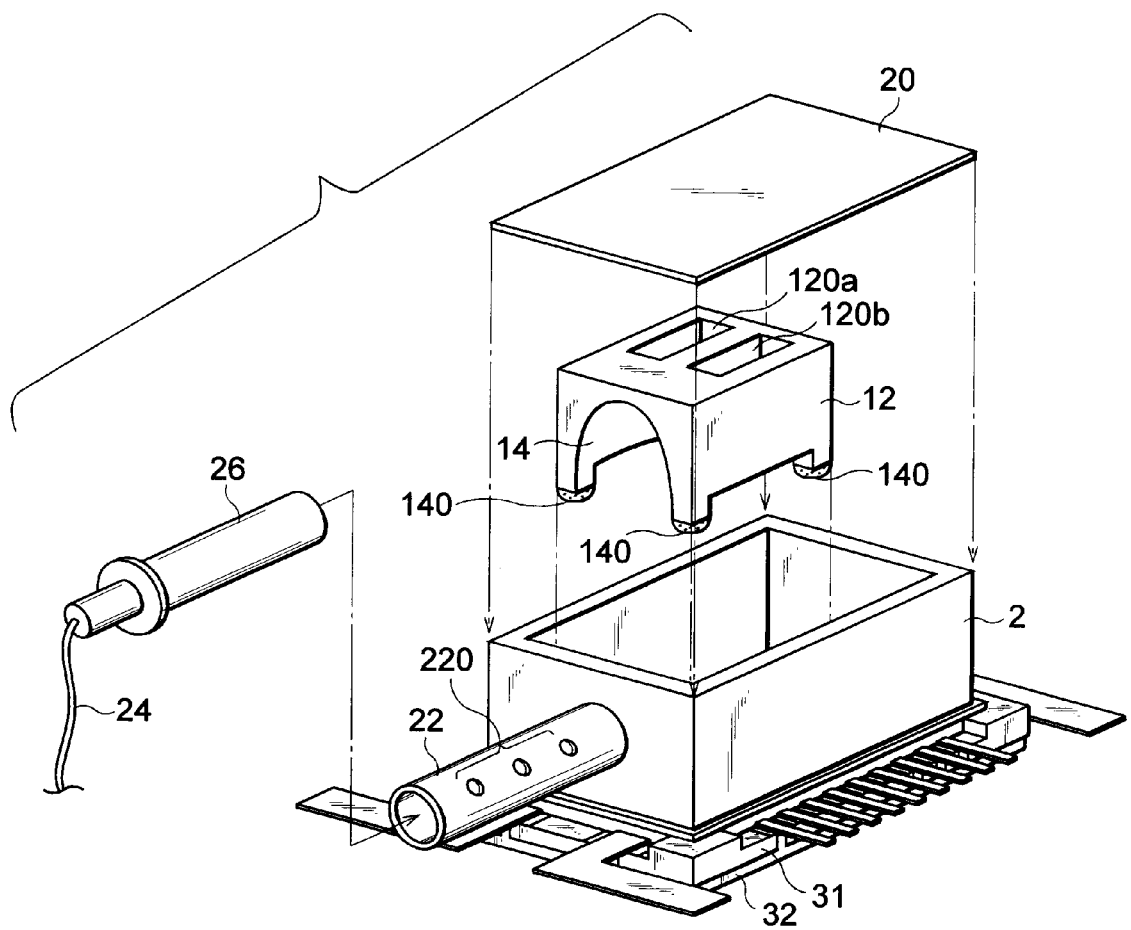
FIG. 1 is a view showing an assembling step for explaining a schematic configuration of an optical module.
Figure 2:
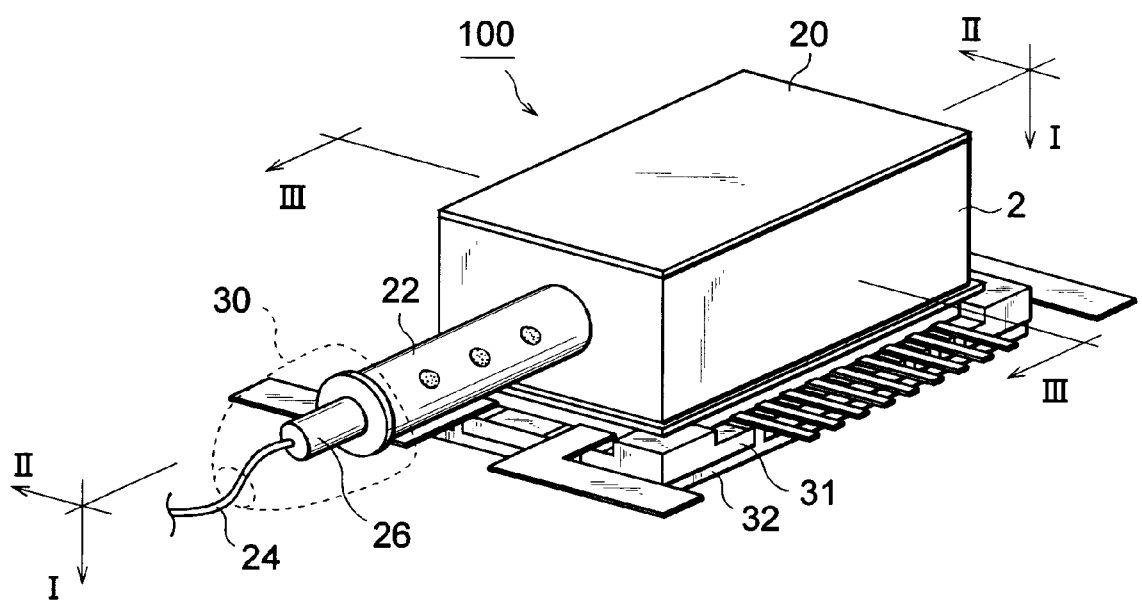
FIG. 2 is a perspective view showing the exterior of the optical module obtained through the assembling step of FIG. 1.

FIG. 1 is a view showing an assembling step for explaining the schematic configuration of an optical receiver module, whereas FIG. 2 is a perspective view showing the optical receiver module obtained through the assembling step shown in FIG. 1.

As shown in FIG. 1, the optical receiver module comprises a housing 2, having amounting surface for mounting a semiconductor light-receiving device. A side wall of the housing 2 is provided with a sleeve 22 which supports a ferrule 26. A bottom part of the housing 2 is provided with a plurality of lead pins supported by an insulating member 31.

An optical reflecting member 12 and the bottom portion of the housing 2 (the mounting surface of the light-receiving device) are bonded together with a predetermined adhesive, whereas an opening portion of the housing 2 is sealed by a lid 20 with a predetermined adhesive. The ferrule 26 is bonded and fixed in the state inserted into the sleeve 22. Here, as shown in FIG. 1, the sleeve 22 is provided with a plurality of rows of through holes 220, arranged along the extending direction of the sleeve 22, for injecting an adhesive to bond the ferrule 26.

Figure 3A:
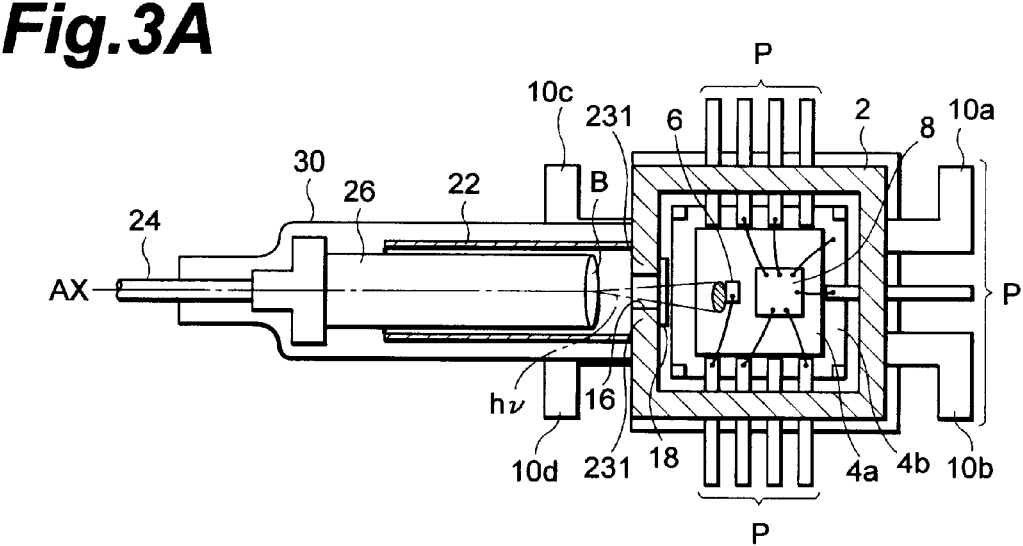
Figure 3B:
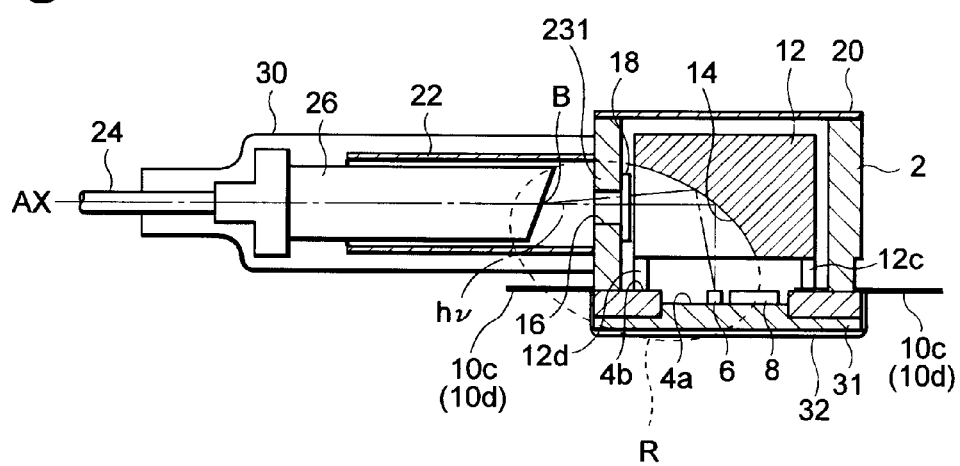
Figure 3C:
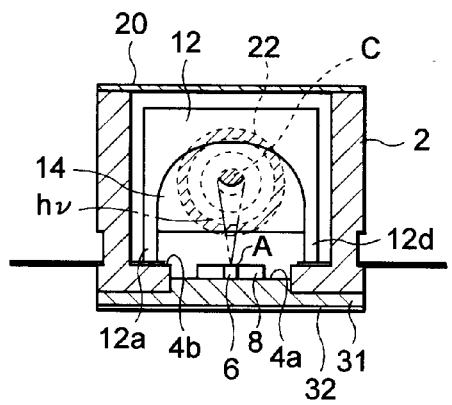
Figure 4:
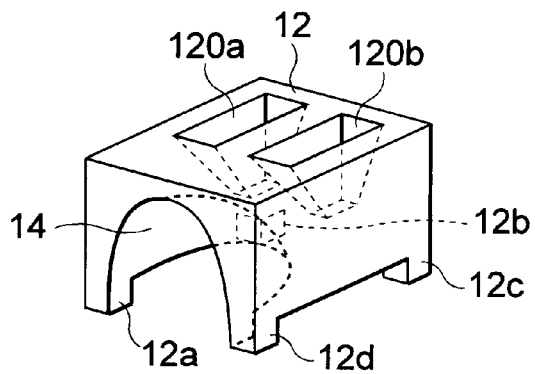
FIG. 4 is a perspective view showing the configuration of an optical reflecting member applicable to the present invention.

The inner configuration of the optical receiver module will now be explained. FIGS. 3A to 3C are sectional views showing the inner configuration of the optical module of FIG. 2, in which FIG. 3A is a sectional view taken along the line I—I in FIG. 2, FIG. 3B is a sectional view taken along the line II—II in FIG. 2, and FIG. 3C is a sectional view taken along the line III—III in FIG. 2. FIG. 4 is a perspective view showing the configuration of an optical reflecting member applicable to the optical module of FIG. 2.

In each of the sectional views shown in FIGS. 3A to 3C, a light-receiving device 6 such as PIN photodiode and a preamplifier 8 for amplifying electronic signals outputted from the light-receiving device 6 are firmly attached to an inner bottom face 4a of the housing 2 (having a metal-plated surface). The bottom face of the housing 2 is provided with a plurality of lead pins P such as power-supplying lead pins 10a, 10b for supplying electric power to the light-receiving device 6 and preamplifier circuit 8, signal output lead pins for outputting the output signals of the preamplifier circuit 8 to the outside, and ground lead pins 10c, 10d. These lead pins P, the light-receiving device 6 and preamplifier circuit 8 are connected to each other with bonding wire. Among the plurality of lead pins P, the power-supplying lead pins 10a, 10b and ground lead pins 10c, 10d are formed wider to reduce their impedance and inductance to improve high-frequency characteristics and prevent deteriorating and unstable operations such as high-frequency oscillation.

A side wall of the housing 2 is formed with a light entrance window 16 having a predetermined inside diameter defined by a flange 231. A a transparent member 18 (e.g., a sapphire window) firmly attached to the inner end face of the housing 2 covers the light entrance window 16. A tubular sleeve 22 matching the light entrance window 16 is attached to the outer end face of the housing 2, whereas the ferrule 26 attached to the front end of the optical fiber 24 is inserted into the sleeve 22. The contour of a virtually defined rotational ellipsoid is indicated by R in FIG. 3B, whereas the core of the optical fiber 24 is indicated by C in FIG. 3C.

Above the light-receiving device 6 and the preamplifier circuit 8, the resin-molded optical reflecting member 12 having substantially a rectangular form, as shown in FIG. 4, is installed. Its lower end portions 12a, 12b, 12c, 12d provided at its four corners are firmly attached to the other inner bottom face 4b of the housing 2 with a bonding resin 140 (which is preferably a UV-curable resin or thermosetting resin). The upper face of the optical reflecting member 12 is provided with two depressions 120a, 120b (engagement grooves) contributing to the positioning of the optical reflecting member 12 itself.

The surface of the optical reflecting member 12 opposing the light-receiving device 6 is formed with a reflecting surface 14 having a concave surface form coinciding with a portion of the rotational ellipsoid. The optical reflecting member 12 is disposed such that the light-receiving surface of the light-receiving device 6 coincides with one focal point A of the rotational ellipsoid, whereas the end face (including the core end face) of the optical fiber 24 coincides with the other focal point B (see FIGS. 3B and 3C).

The opening of the housing 2 is sealed with the lid 20, thereby the inside of the housing 2 is hermetically sealed after the optical reflecting member 12 is fixed at a predetermined position.

The positioning of the reflecting surface 14 of the optical reflecting member 12 and the light-receiving device 6 and the end face of the optical fiber 24 with respect to each other is carried out as follows. The optical reflecting member 12 is inserted into the housing 2, and their mutual positions are adjusted such that the light-receiving surface of the light-receiving device 6 is to coincide with one focal point A of the rotational ellipsoid R, whereas the end face of the core in the optical fiber 24 is to coincide with the other focal point B. Then, the optical reflecting member 12 is firmly attached to the inner bottom face 4b of the housing 2 with an adhesive or the like. In this positioning step, even after the optical reflecting member 12 is installed at a predetermined position, if the position of the end face of the optical fiber 24 is minutely adjusted in the direction of the optical axis AX, then the end face of the optical fiber 24 can be made to coincide with the focal point B.

In the optical receiver module having such a configuration, a light hv emitted with an angle from the end face of the optical fiber 24 passes through the light entrance hole 16 and the window member 18 to reach the reflecting surface 14. The light hv reflected by the reflecting surface 14 is collected to the light-receiving surface of the light-receiving device 6. Since the light-receiving surface of the light-receiving device 6 and the end face of the optical fiber 24 coincide with the focal points A and B, respectively, even if the light hv emitted from the end face has various emanating directions, it will always reach the light-receiving surface of the light-receiving device 6. As a consequence, an aligning mechanism having an essentially high accuracy is realized.

Figure 5A:
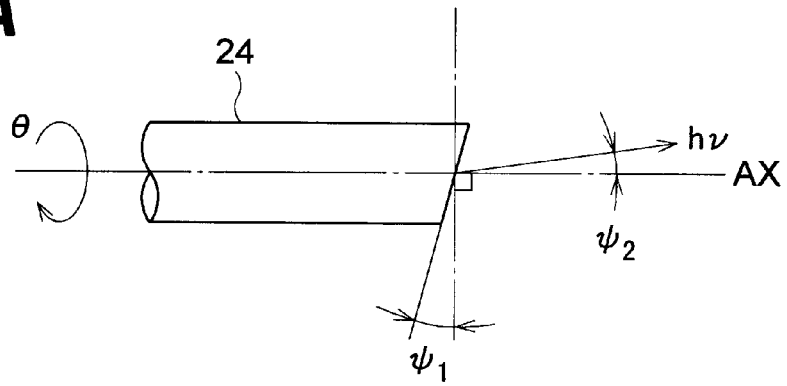
Figure 5B:
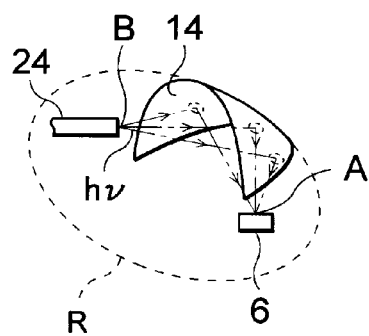

The end face of the optical fiber 24 is obliquely ground by a predetermined angle $\psi_1$ (e.g., $\psi_1 = 8°$) with respect to the optical axis AX, as shown in FIG. 5A, in order to prevent the light reflected by the end face from returning onto the same optical axis. The light hv thus emitted from the obliquely cut end face is diffracted with respect to the optical axis AX of the optical fiber 24 by an angle $\psi_2$ (e.g., $\psi_2 = 4°$) which is ½ of the grinding angle $\psi_1$. If the end face of the optical fiber 24 rotates about the optical axis AX, the light emitted will be uncertain. In such a case, in the conventional optical receiver module configured such as to reflect the luminous flux by a plane reflecting mirror may be problematic in that the emitted luminous flux shifts from the light-receiving surface of the light-receiving device, thereby lowering the optical coupling efficiency, and fine adjustment with a very high accuracy is necessary. In the present optical receiver module, as shown in FIG. 5B, even if the light hv has various emanating directions, it will be reflected by the reflecting surface 14 at a certain position and always reach the light-receiving surface of the light-receiving device 6 positioned at the focal point A as long as the end face of the optical fiber 24 coincides with the focal point B. The influence of the above-mentioned dependence on rotation can be neglected. Therefore, it becomes unnecessary to adjust the rotating direction θ of the optical fiber 24.

Since the optical reflecting member 12 is formed separately of the housing 2, fine alignment of its attached position can easily be carried out even after being installed at a predetermined position. Further, the single optical reflecting member 12 can realize an essentially excellent aligning mechanism without requiring a plurality of optical elements to be assembled together to realize an accurate aligning mechanism. Not only the number of components can be reduced, but also the adjusting positions, packaging area, packaging cost, and aligning cost can be cut down.

Though the optical reflecting member 12 shown in FIG. 4 has the lower end portions 12a, 12b, 12c, 12d disposed at the four corners thereof in order to attain a predetermined gap between the light-receiving device 6 and the reflecting surface 14, it should not be restricted to such a configuration. Any configuration may be employed as long as it can yield such a gap that the lower end of the optical reflecting member 12 does not contact with the light-receiving device 6 and the preamplifier circuit 8. For example, employing a stepped structure for the inner bottom face and the optical reflecting member on the inner bottom face 4b which is higher than the bottom face 4a, then the lower end portions 12a to 12d would be unnecessary.

Though this embodiment relates to the optical reflecting member 12 by resin-molded, it may be realized by a molten glass member or by carving a metal material. The optical reflecting member 12 formed of a molten glass member or metal material is firmly attached to the inner bottom face of the housing 2 by using an adhesive.

In addition, each of the reflecting surface 14 of the resin-molded optical reflecting member 12, that of the molten glass material, and that of the optical reflecting member obtained by carving a metal material is coated with a light-reflecting metal such as gold (Au), silver (Ag), or aluminum (Al) by vapor deposition, sputtering, or the like. In view of the reflectivity with respect to the wavelength (1.3 μm to 1.5 μm) currently used in optical communications, gold (having a reflectivity of about 99%) or silver (having a reflectivity of about 98%) is used more preferably than aluminum (having a reflectivity of about 80%). In order to attain a long-term stability taking corrosion on the reflecting surface into account, gold or aluminum is employed more preferably than silver. In view of the adhesiveness, aluminum is preferably employed. Preferably, the housing is constituted by a metal material which generates a magnetic force against a magnet with a predetermined strength or molded by a resin and further plated with such a metal material.

A positioning device specifically realizing the positioning operation (aligning operation) of the optical reflecting member 12 mentioned above will now be explained.

Figure 6A:
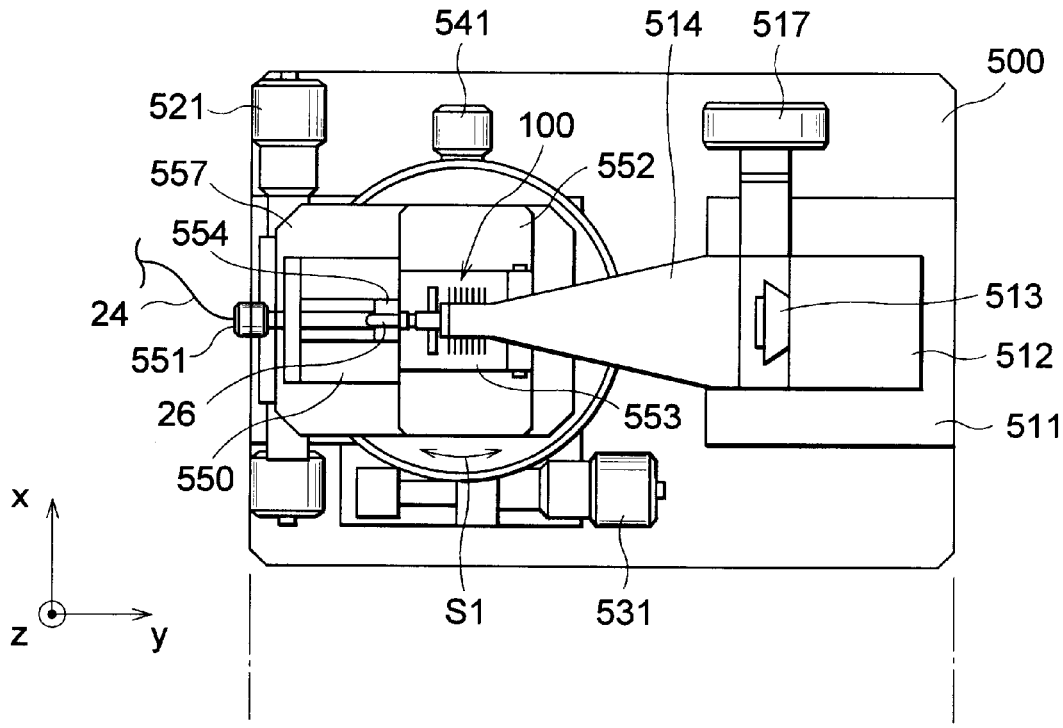
Figure 6B:
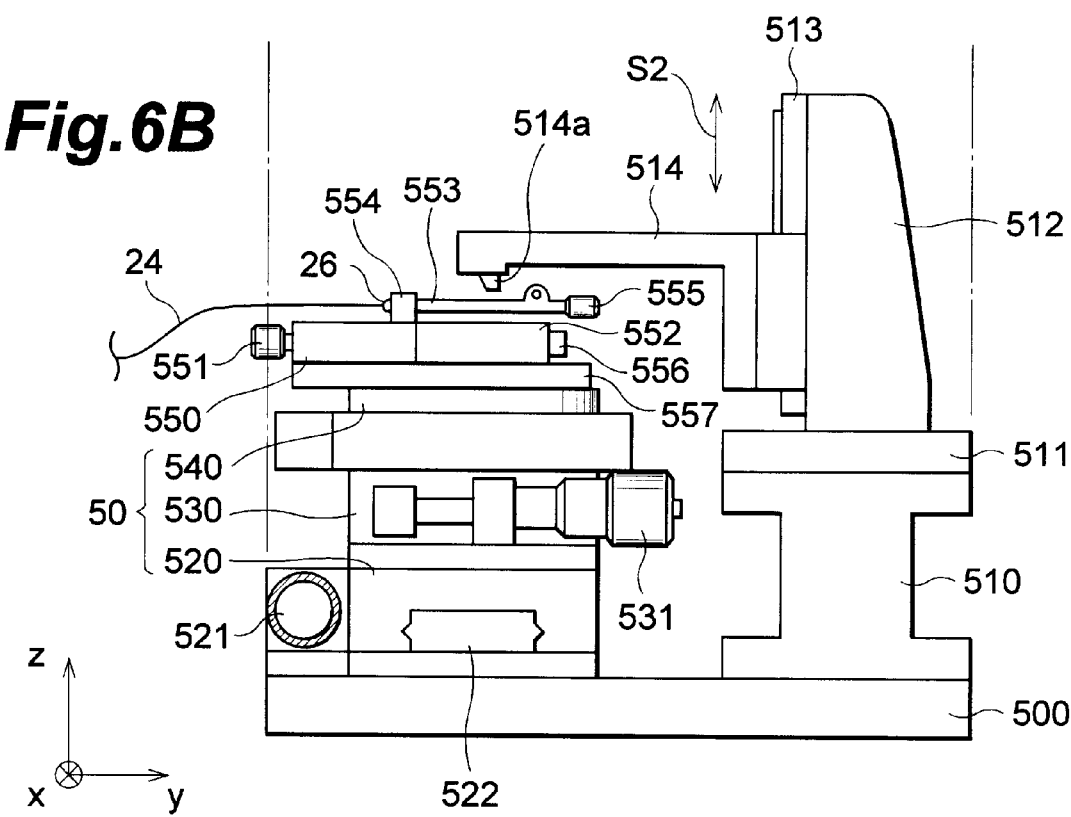
FIG. 6B is a side view thereof.

FIGS. 6A and 6B are plan and side views, respectively, showing the configuration of the positioning device for installing the optical reflecting member 12 at a predetermined position in the housing 12. The positioning device comprises one substrate 500, a first mechanism for maintaining the optical reflecting member 12 in a stationary state with respect to the substrate 500, and a second mechanism for moving the housing 2 (in which the ferrule 26 attached to the front end of the optical fiber 24 is temporarily inserted within the sleeve 22) relative to the stationary optical reflecting member 12, both of the first and second mechanisms being disposed on the substrate 500.

The first mechanism comprises a base 510, a stage 511 disposed on the base 510, a support 512 disposed on the stage 511, and a movable cantilever 514 supported by the support 512. A linear guide 513 is attached to the support 512 along the depicted Z axis, whereas the cantilever 514 is attached to the linear guide 513. A front end portion of the cantilever 514 is provided with a protrusion 514a for setting the optical reflecting member 12 relative to the substrate 500. In the drawings, 517 refers to a control handle for moving the cantilever 514 along the directions indicated by the depicted arrow S2 (along the linear guide 513).

The second mechanism comprises a driving mechanism 50 for moving the housing 2 relative to the optical reflecting member 12; and an upper stage 557 for supporting the ferrule 26, which is driven by the driving mechanism 50. A support table 552 is disposed on the upper stage 557 with a fastening bolt 556. The support table 552 comprises a positioning structure for installing the housing 2 at a predetermined location. The ferrule 26 is secured to a holder 554. While holding the ferrule 26, the holder 554 is supported by a position-adjusting mechanism 550, which moves the holder 554 along the depicted Y axis under the control of a position-adjusting bolt 551. In the apparatus shown in FIGS. 6A and 6B, the holder 554 and the position-adjusting mechanism 550 constitute a ferrule-supporting mechanism.

The driving mechanism 50 is further constituted by an X-stage 520 movable along the depicted X axis (along a linear guide 522), a Y-stage 530 mounted on the X-stage 520 movable along the depicted Y axis (along a linear guide 530), and a θ-stage 540 mounted on the Y-stage 530 rotatable about the depicted Z axis. The upper stage 557 is installed on the Z-stage 540. The X-stage 520, Y-stage 530, and θ-stage 540 are controlled by their respective handles 521, 531, and 541.

Figure 7:
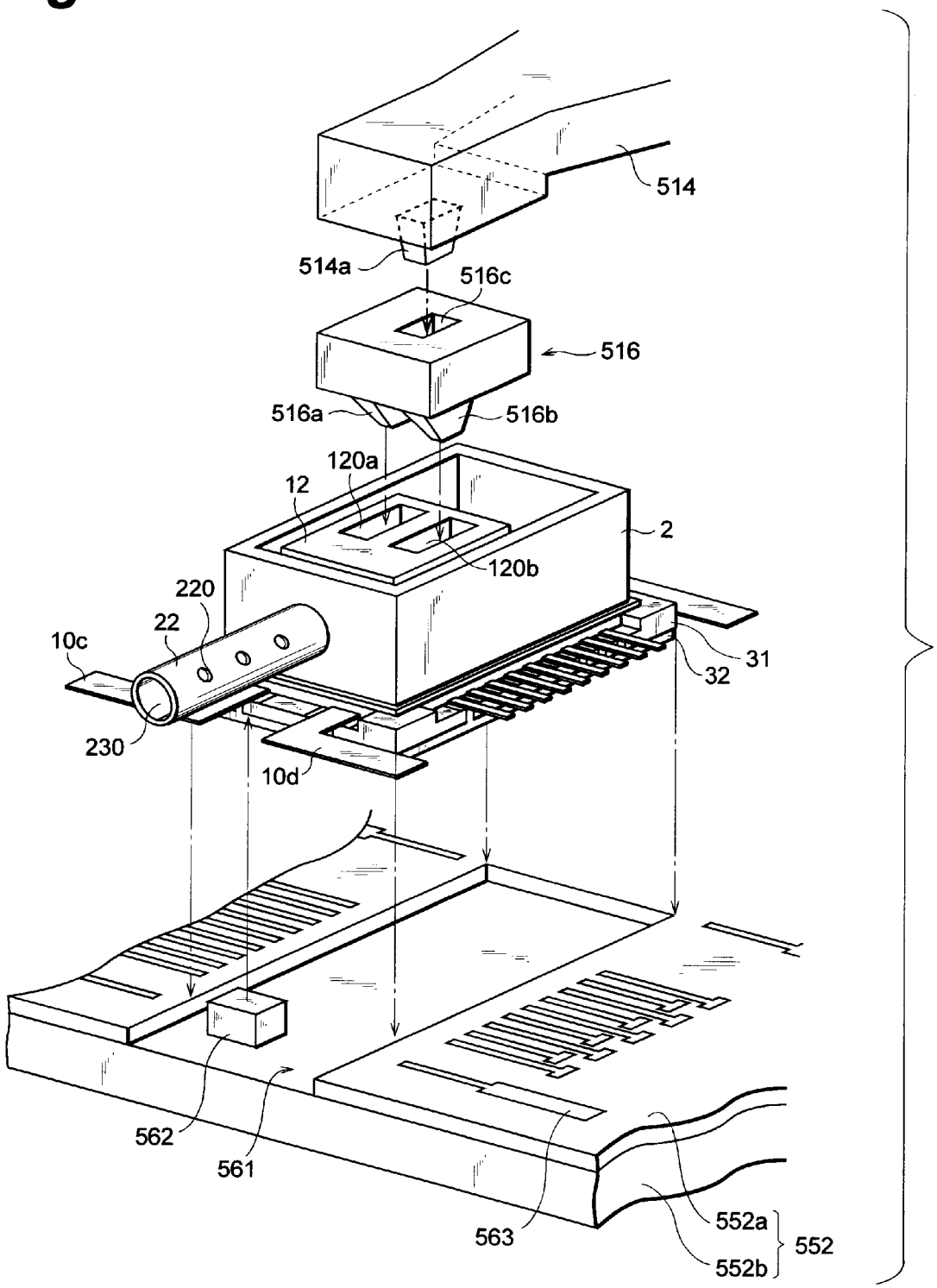
FIG. 7 is a view for explaining the state of installation of the optical module onto a support table in the positioning device shown in FIGS. 6A and 6B.

FIG. 7 is a view for explaining the state of installation of the housing 2 onto the support table 552 in the positioning device shown in FIGS. 6A and 6B. The support table 552 is constituted by a support plate 552b; and a printed board 552a, disposed on the support plate 552b, having a cutout and wiring patterns 563 electrically connected to the respective lead pins extending from the housing 2. The base portion (constituted by the insulating member 31 and metal plates 32) attached to the bottom part of the housing 2 is fitted into the cutout of the printed board 552a. Further, in the state where the lead terminals 10c, 10d hold a reference post 562 therebetween, the housing 2 is positioned as its base portion is pressed against the reference post 562. Though not illustrated in FIG. 7, in order to maintain an electric contact state, the individual lead terminals extending from the housing 2 are pressed against their corresponding wiring patterns 563 on the printed board 552a by the fixing member 553.

The upper face of the optical reflecting member 12 is provided with the depressions 120a, 120b, adapted to engage protrusions 516a, 516b of a holding member 516. The holding member 516 is a magnet or the like which generates a magnetic force against the housing 2 with a predetermined strength. When the holding member 516 is attached to the opening portion of the housing 2 in the state where the protrusions 516a, 516b engage their corresponding depressions 120a, 120b of the optical reflecting member 12, then the position of the optical reflecting member 12 is held (the optical reflecting member 12 is prevented from positionally shifting). The upper face of the holding member 516 is provided with a depression 516c, into which the protrusion 514a formed at the front end portion of the cantilever 514 is inserted. As a consequence, the movement of the cantilever 514 is transmitted to the optical reflecting member 12 via the holding member 516.

Figure 8A:
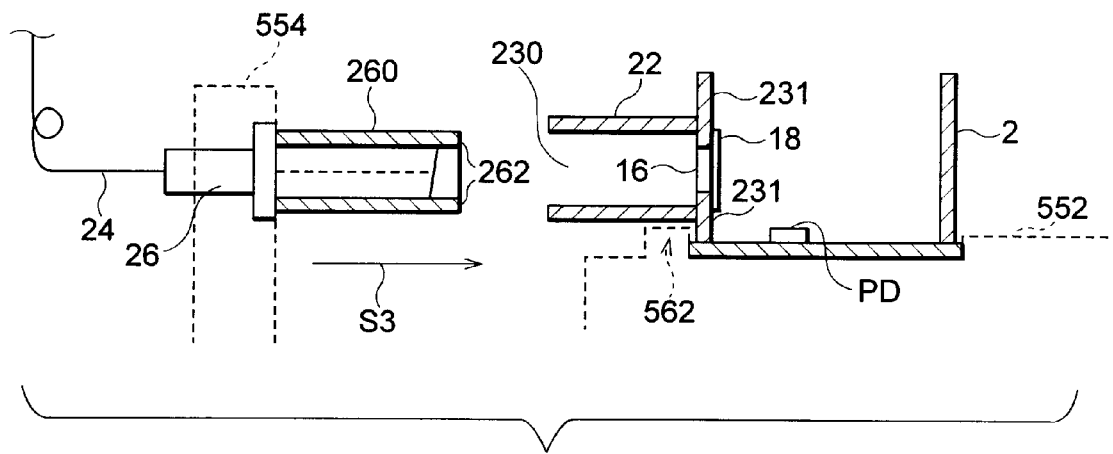
FIGS. 8A and 8B are views for explaining an operation for attaching a ferrule to a sleeve in the positioning device shown in FIGS. 6A and 6B, in which FIGS. 8A and 8B indicate the states before and after the attachment, respectively.
Figure 8B:
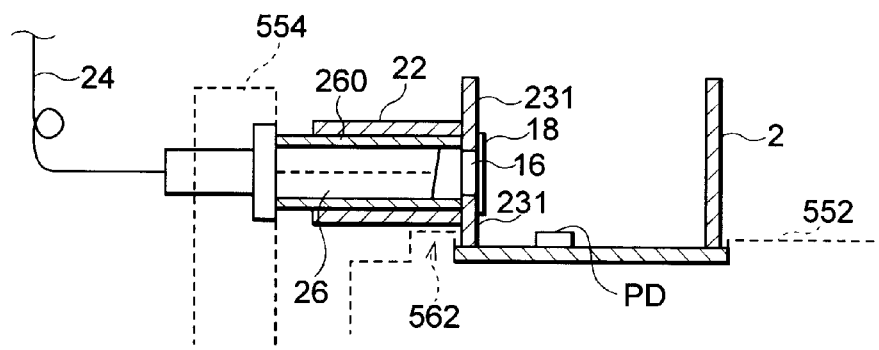

As shown in FIG. 8A, an auxiliary member 260 is attached to the ferrule 26 held by the holder 554, such that the end face of the optical fiber 24 is installed at a predetermined position within the sleeve 22. As the position-adjusting mechanism 550 moves the holder 554 in the direction indicated by the depicted arrow S3, the ferrule 26 having the auxiliary member 260 attached thereto is inserted into the sleeve 22 (see FIG. 8B). The auxiliary member 260 is constituted by a cylindrical metal tube.

The ferrule 26 is inserted into the sleeve 22 until an end face 262 of the auxiliary member 260 abuts to the side wall of the housing 2 where the light entrance hole 16 is disposed. The front end (including the end face 262) of the auxiliary member 260 extends to the front end of the ferrule 26. Abutting the end face 262 of the auxiliary member 260 abuts to the side wall 231 of the housing 2, the optimal distance is defined between the end face of the optical fiber 24 supported by the ferrule 26 and the light entrance hole 16.

Figure 9A:
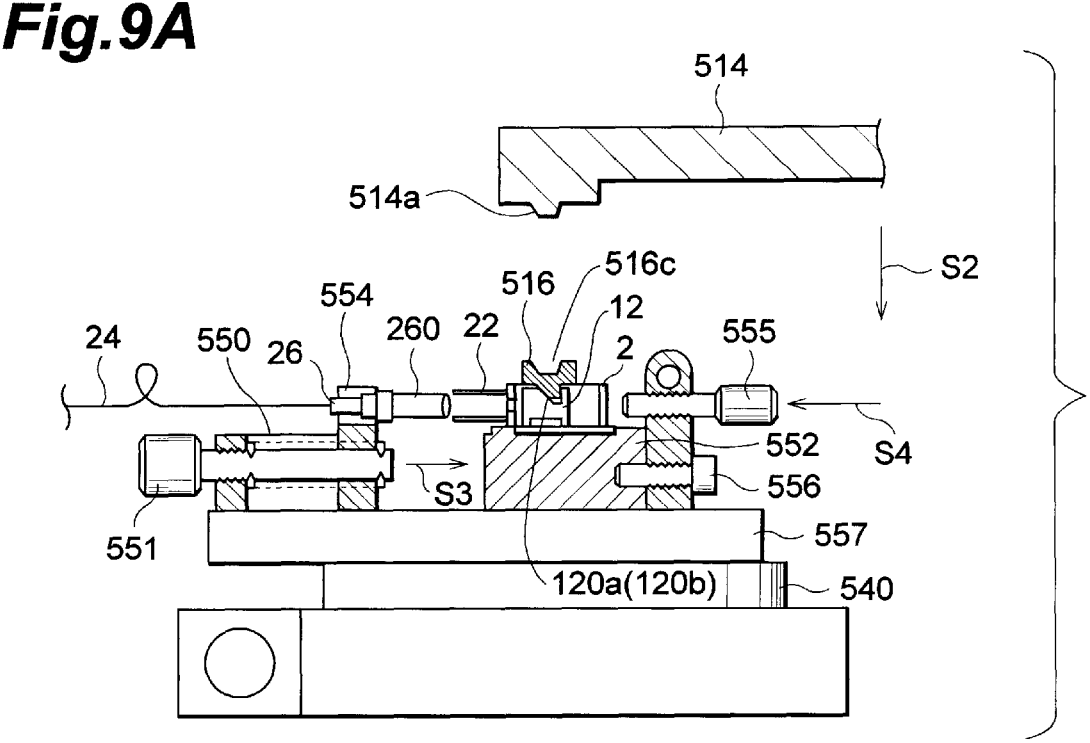
FIGS. 9A and 9B are views for explaining an operation for securing the optical reflecting member in the positioning device shown in FIGS. 6A and 6B.

As shown in FIG. 9A, the optical reflecting member 12 is installed within the housing 2. The lower end portions 12a, 12b, 12c, 12d of the member 12 are coated with the resin 140 (see FIG. 1) such as UV-curable resin or thermosetting resin. At this time, the protrusions 516a, 516b of the holding member 516 are inserted into their corresponding engagement grooves 120a, 120b formed in the optical reflecting member 12 and the holding member 516 (magnet) is attached to the housing 2. The optical reflecting member 12, with its installed position being held by the magnetic force between the housing 2 and the holding member 516, moves on the mounting surface in the housing 2 along with the movement of the holding member 516.

By moving the front end of the position-adjusting bolt 555 in the direction indicated by the depicted arrow S4, the housing 2 is installed at a predetermined position of the support table 552. Then, by moving the holder 554 in the direction indicated by the depicted arrow S3, the ferrule 26 held by the holder 554 is inserted into the sleeve 22 together with the auxiliary member 260. Also, as the cantilever 514 moves in the direction of the depicted arrow S2, the protrusion 514a at its front end portion fits into the depression 516a of the holding member 516.

Figure 9B:
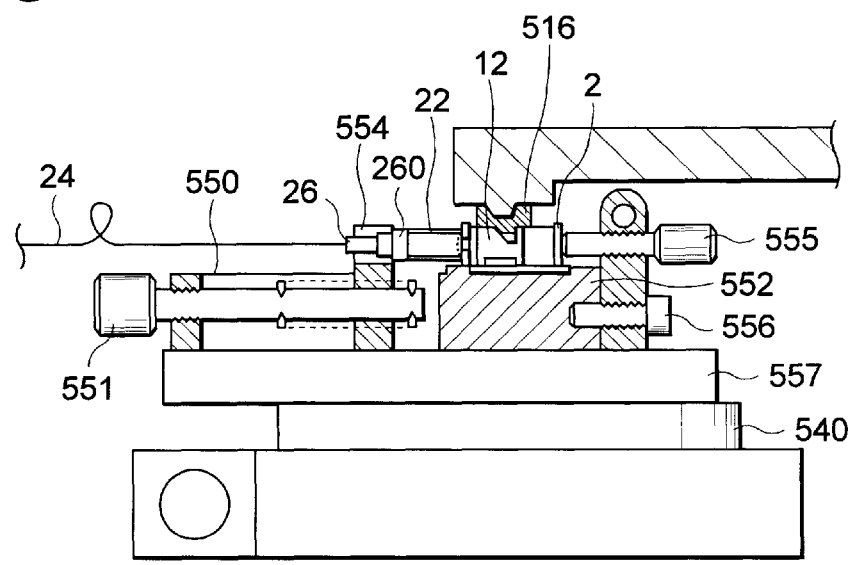
Figure 12B:
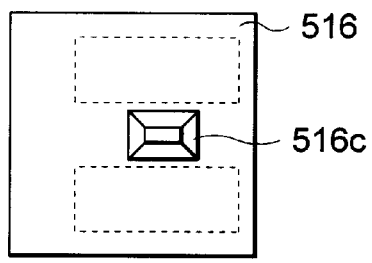
FIGS. 12A to 12D are views showing the configuration of a holding member.
Figure 12A:
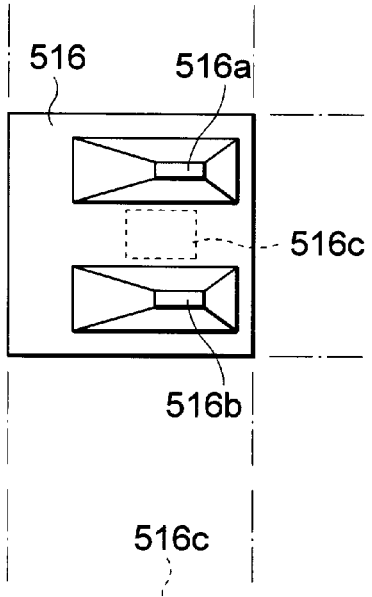
Figure 12D:
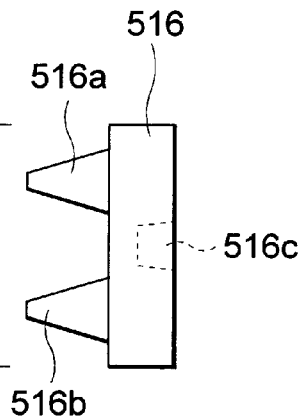
Figure 12C:
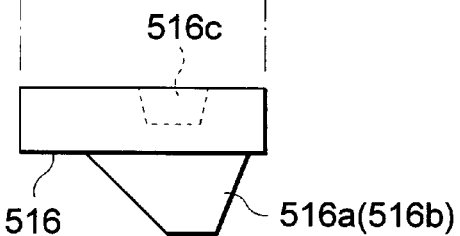

As the positioning device attains the state shown in FIG. 9B through the foregoing installing step, the optical reflecting member 12 is placed into a stationary state with respect to the substrate 500. On the other hand, the housing 2 is movable by the driving mechanism 50 relative to the optical reflecting member 12. As shown in FIG. 9B, the positioning of the optical reflecting member 12 is carried out by monitoring the output of the light receiving device 6 while signal light is emitted from the optical fiber 24 to the light-receiving surface of the light-receiving device 6 (PD) via the reflecting surface 14 of the optical reflecting member 12. Namely, while the position of the housing 2 is changed by the driving mechanism 50, the relative position between the optical reflecting member 12 and housing 2 that yields the maximum output from the light-receiving device 6 is determined.

The resin applied to each of the lower end portions 12a, 12b, 12c, 12d of the optical reflecting member 12 is cured at the position where the output signal from the light-receiving device 6 is maximized, thereby the positioning of the optical reflecting member 12 is completed.

The curing of the resin is carried out in the state of removing the module from the positioning device. FIG. 10 is a perspective view showing the optical module when the positioning operation is completed. Though the optical reflecting member 12 has not been fixed to the housing 2 yet, the holding member 516 attached to the housing 2 by means of the magnetic force prevents the housing 2 and the optical reflecting member 12 from deviating from each other.

The configurations of the optical reflecting member 12 and holding member 516 will now be explained in further detail. FIGS. 11A to 11C are views showing the configuration of the optical reflecting member 12, whereas FIGS. 12A to 12D are views showing the configuration of the holding member 516.

As can be seen from FIGS. 11A to 11C, the optical reflecting member 12 is provided with the lower end portions 12a, 12b, 12c, 12d extending from its bottom face opposing the mounting surface (including the surfaces 4a, 4b) for the light-receiving device 6 in the housing 2. The upper face facing the holding member 516 and the front end portion of the cantilever 514 is provided with the engagement grooves 120a, 120b. Preferably, each of the engagement grooves 120a, 120b has such a shape as to taper down its opening area to the bottom face.

As can be seen from FIGS. 12A to 12D, the bottom face of the holding member 516 (the surface opposing the optical reflecting member 12) is provided with the protrusions 516a, 516b to engage their corresponding engagement grooves 120a, 120b of the optical reflecting member 12. The upper face of holding member 516 is further provided with the depression 516c to engage with the protrusion 514a disposed at the front end portion of the cantilever 514. Preferably, each of the protrusions 516a, 516b vertically has a tapered form.

When the engagement grooves 120a, 120b formed in the optical reflecting member 12 and the protrusions 516a, 516b formed at the holding member 516 are shaped as mentioned above, then it becomes easier for the protrusions 516a, 516b to fit into their corresponding engagement grooves 120a, 120b.

The holding member 516 may easily be obtained by molding a resin or ceramic material containing iron powder or the like into such a shape as that shown in FIGS. 12A to 12D and then magnetizing it (or by shaping after magnetization). Alternatively, a magnet member may be attached to a plastic member such as that shown in FIGS. 12A to 12D or the like.

After the positioning of the optical reflecting member 12 and the fixing operation to the housing 2 are completed, the ferrule 26 and the sleeve 22 are bonded and secured to each other.

Though the holding member 516 is attached to the housing 2 in this embodiment, it may be attached to other members different from the housing 2. In the latter case, as long as the relative positions of the housing 2 and optical reflecting member 12 are held by the holding member and the other members, plastic members positioned with high accuracy can be bonded to each other, for example.

As explained in the foregoing, since this embodiment employs an optical reflecting member having a reflecting surface in conformity to the shape of a rotational ellipsoid, and the optical reflecting member is installed such that one focal point coincides with the end face of an optical fiber whereas the other focal point coincides with the light-receiving surface of a light-receiving device, light emitted from the end face of the optical fiber, can always reach the light-receiving surface of the light-receiving device. There can be provided an optical reflecting member exhibiting excellent effects in that aligning accuracy is essentially high, aligning adjustment is easy, no adjustment is required for the rotational angle of the optical fiber, the number of components can be reduced, and packaging cost and adjustment cost can be cut down.

Also, a holding member generating a magnetic force against the housing with a predetermined strength is used for positioning the optical reflecting member in this embodiment. The magnetic force generated between the holding member and the housing prevents the once-positioned optical reflecting member from positionally deviating, thereby being effective in yielding an optical module in which alignment is adjusted with high accuracy.

From the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making an optical module having a housing in which an optical member is fixed at a predetermined position on a mounting surface of said housing, said optical member having a surface with a predetermined form for optically coupling an optical fiber and a semiconductor device on said mounting surface of said housing to each other, said method comprising the steps of:

installing said optical member in said housing through an opening portion of said housing, and setting said optical member at a predetermined position on said mounting surface of said housing with an adhesive interposed therebetween;

attaching a holding member to an edge of said housing defining said opening portion such that said holding member presses said optical member to said mounting surface and covers at least part of said optical member, said holding member including a material which generates a magnetic force against said housing with a predetermined strength and comprising a structure for holding said optical member at said predetermined position in said housing;

adjusting a position of said optical member while moving said optical member together with said holding member in said housing; and curing said adhesive while the adjusted position of said optical member is maintained by said holding member.

2. A method according to claim 1, wherein said adhesive resin is at least one of UV-curable resins and thermosetting resins.

3. A method according to claim 1, wherein said optical member has a face provided with a depression;

said holding member having a protrusion adapted to be engaged with said depression.

4. A method according to claim 3, wherein said optical reflecting member has a reflecting surface with a concave form coinciding with a portion of shape of a virtually defined rotational ellipsoid.

5. A method according to claim 3, wherein said optical member is installed at a predetermined position such that a core end face of said optical fiber coincides with the first focal point of said rotational ellipsoid whereas a main surface of said semiconductor device coincides with the second focal point of said rotational ellipsoid.

* * * * *